(12) United States Patent
Milan

(10) Patent No.: US 9,102,444 B2
(45) Date of Patent: Aug. 11, 2015

(54) BEVERAGE CONTAINER LID

(71) Applicant: Enterprise Express, Inc., Chantilly, VA (US)

(72) Inventor: Michael Milan, Chantilly, VA (US)

(73) Assignee: Enterprise Express, Inc., Chantilly, VA (US)

( * ) Notice: Subject to any disclaimer, the term of this patent is extended or adjusted under 35 U.S.C. 154(b) by 312 days.

(21) Appl. No.: 13/661,431

(22) Filed: Oct. 26, 2012

(65) Prior Publication Data

US 2014/0117030 A1    May 1, 2014

(51) Int. Cl.
*B65D 43/02*    (2006.01)

(52) U.S. Cl.
CPC .. *B65D 43/0204* (2013.01); *B65D 2543/00046* (2013.01); *B65D 2543/00092* (2013.01); *B65D 2543/00296* (2013.01); *B65D 2543/00351* (2013.01); *B65D 2543/00509* (2013.01); *B65D 2543/00537* (2013.01); *B65D 2543/00555* (2013.01)

(58) Field of Classification Search
CPC ........... B65D 43/0204; B65D 51/1611; B65D 51/22; B65D 51/221; B65D 51/228; B65D 2543/00046; B65D 51/18; B65D 47/10; B65D 2251/0087; B65D 2251/0025; B65D 47/06; A47G 19/2211; A47G 19/2272
USPC ........... 220/713, 259.1, 257.2, 547, 562, 709, 220/731
See application file for complete search history.

(56) References Cited

U.S. PATENT DOCUMENTS

| | | |
|---|---|---|
| 3,360,161 A | 12/1967 | Smith |
| 4,322,014 A | 3/1982 | Philip |
| 4,331,255 A | 5/1982 | Fornier |
| 4,333,583 A * | 6/1982 | Montemarano ............... 220/712 |
| 4,460,101 A | 7/1984 | Tseng |
| 4,738,376 A | 4/1988 | Markus |
| 4,795,052 A | 1/1989 | Hayes, Jr. |
| 5,143,248 A | 9/1992 | Sawatsky |
| 5,409,751 A | 4/1995 | Suzuki et al. |
| 5,538,157 A | 7/1996 | Proshan |
| 5,540,350 A | 7/1996 | Lansky |
| 5,890,619 A | 4/1999 | Belanger |
| 5,928,741 A | 7/1999 | Andersen et al. |
| 5,979,689 A | 11/1999 | Lansky |

(Continued)

FOREIGN PATENT DOCUMENTS

| | | |
|---|---|---|
| JP | 2004-352278 A | 12/2004 |
| JP | 2005-187082 A | 7/2005 |

OTHER PUBLICATIONS

International Search Report and Written Opinion for PCT/US2013/066324, dated Feb. 5, 2014, 7 pages.

*Primary Examiner* — Jeffrey Allen
(74) *Attorney, Agent, or Firm* — Brown & Michaels, PC

(57) ABSTRACT

A beverage container lid includes an interior cover, an exterior cover, and a hinge connecting the interior cover to the exterior cover. The beverage container is versatile in that it may be adapted for use with a beverage container containing a cold beverage, a hot beverage, or a foamy or creamy beverage. The beverage container lid preferably includes a spout, straw perforations, an elevated portion, a reservoir bottom, a well portion, and a pair of retaining walls preventing direct flow of beverage from a pair of openings in the interior cover to the spout. Methods of use and methods of making a the beverage container lid are also described.

12 Claims, 7 Drawing Sheets

(56) References Cited

U.S. PATENT DOCUMENTS

| | | |
|---|---|---|
| 6,176,390 B1 | 1/2001 | Kemp |
| 6,220,476 B1 | 4/2001 | Waller |
| 6,305,571 B1 | 10/2001 | Chu |
| 6,318,584 B1 | 11/2001 | Milan |
| 6,488,173 B2 | 12/2002 | Milan |
| 7,258,234 B2 | 8/2007 | Aardema et al. |
| 7,281,650 B1 | 10/2007 | Milan |
| 2002/0012759 A1 | 1/2002 | Asayama et al. |
| 2002/0108922 A1 | 8/2002 | Hierzer |
| 2004/0191437 A1 | 9/2004 | Asayama et al. |
| 2006/0037962 A1* | 2/2006 | Kim ............................. 220/713 |
| 2006/0124646 A1 | 6/2006 | Guglielmini et al. |
| 2006/0131197 A1 | 6/2006 | Price |
| 2006/0138203 A1 | 6/2006 | Turvey et al. |
| 2007/0000390 A1 | 1/2007 | Albrecht |
| 2007/0051653 A1 | 3/2007 | Tilton |
| 2007/0062943 A1* | 3/2007 | Bosworth ..................... 220/212 |
| 2007/0141286 A1 | 6/2007 | Takase et al. |
| 2007/0164045 A1 | 7/2007 | Wydler et al. |
| 2007/0197363 A1 | 8/2007 | Parrotta et al. |
| 2007/0215618 A1 | 9/2007 | Wright et al. |
| 2007/0215626 A1 | 9/2007 | Wright, Jr. et al. |
| 2008/0128382 A1 | 6/2008 | Yamamoto et al. |
| 2009/0108006 A1 | 4/2009 | Milan |
| 2012/0248133 A1 | 10/2012 | Danks et al. |

* cited by examiner

BEVERAGE CONTAINER LID

BACKGROUND OF THE INVENTION

1. Field of the Invention

The invention pertains to the field of beverage container lids. More particularly, the invention pertains to versatile and biodegradable beverage container lids.

2. Description of Related Art

Beverage container lids for beverage containers holding hot beverages are known in the art.

U.S. Pat. No. 6,488,173, entitled "Beverage Container Lid Having Baffle Arrangement for Liquid Cooling" and issued Dec. 3, 2002 to Milan, discloses a removable beverage container lid. The lid has a substantially enclosed space defined between an exterior cover and an interior cover. An inlet opening is formed in the interior cover directing a hot beverage to flow into the substantially enclosed space. A partition or wall assembly with a height extending to be located substantially against the exterior cover and a length at least equal to the length of an inlet opening is attached to the interior cover at the forward edge of the inlet opening. A gap area is located between the partition or wall assembly and the peripheral edge of the exterior cover. A dispensing opening formed in the exterior cover is connected with the gap area. Hot beverage is required to flow around the partition or wall assembly and into the gap area prior to flowing through the dispensing opening exteriorly of a beverage container.

U.S. Patent Application Publication No. 2009/0108006, entitled "Beverage Container Lid Having Liquid Cooling Effect" by Milan and published Apr. 30, 2009, discloses a lid for a beverage container including external and internal covers, which, when coupled together, define a cooling reservoir between them to receive and cool hot liquids that may be held in the beverage container. The external cover includes ventilation holes and a dispensing spout for dispensing the liquid to the user. The internal cover includes walls used for directed the hot liquid that enters from the beverage container. Entrance apertures are located in the interior cover to allow the hot liquid to enter the reservoir. Dispensing walls cooperate to direct the hot liquid entering through the entrance apertures and to separate the hot liquid from cooled liquid exiting the reservoir through a dispensing aperture in the spout.

The above-mentioned patent publications are hereby incorporated by reference herein.

Beverage container lids for beverage containers holding cold beverages are also known in the art.

Plastic beverage container lids have been conventionally prepared from polyethylene, polyvinyl chloride, polypropylene, polystyrene, and other resins. Although some of the lids prepared from these resins have excellent transparency, these lids have a very low rate of degradation and thus remain semi-permanently when discarded as refuse and buried under the ground. Disposal of these beverage container lids in the ocean causes aesthetic damage or destruction of the living environment of marine organisms.

Conventional beverage container lids are not made from lactic acid-based polymers. On processing a lactic acid-based polymer by conventional molding methods, such as compression molding (thermoforming) and injection molding, the polymer does not provide beverage container lids having sufficient impact strength for practical use as transparent or non-transparent beverage container lids.

SUMMARY OF THE INVENTION

A beverage container lid includes an interior cover, an exterior cover, and a hinge connecting the interior cover to the exterior cover. The beverage container is versatile in that it may be adapted for use with a beverage container containing a cold beverage, a hot beverage, or a foamy or creamy beverage. The beverage container lid preferably includes a spout, straw perforations, an elevated portion, a reservoir bottom, a well portion, and a pair of retaining walls preventing direct flow of beverage from a pair of openings in the interior cover to the spout. The beverage container lid is preferably made of a biodegradable material, and more preferably, a biodegradable polymeric material. Methods of use of the beverage container are also described.

A beverage container lid includes an interior cover, an exterior cover, and a hinge connecting the interior cover to the exterior cover and foldable to orient the exterior cover over the interior cover. The interior cover has a pair of openings to allow passage of a beverage in a beverage container through the interior cover. The interior cover includes a reservoir bottom and a well portion extending downward and outward from an edge of the reservoir bottom to form a well. The interior cover also includes a pair of retaining walls, each retaining wall extending upward and outward from the reservoir bottom and flanking a side of the well portion and a side of one of the pair of openings, each retaining wall extending inward past an edge of the opening. The interior cover also includes an outer lip extending around an outer edge of the reservoir bottom, the well portion, and the retaining walls and formed to receive a rim of the beverage container and an inner lip extending inward from the outer edge of the interior cover. The exterior cover has an outer edge sized to be received by the inner lip of the interior cover. The exterior cover includes a flat portion extending inward from the outer edge of the exterior cover, a spout extending upward from the flat portion, and an elevated portion extending upward from an edge of the flat portion.

The interior cover, the exterior cover, and the hinge are arranged such that, when the hinge is folded and the outer edge of the exterior cover is received by the inner lip of the interior cover, the spout is located above the well portion and each retaining wall contacts the flat portion of the exterior cover, thereby preventing a beverage in the beverage container from flowing directly from the openings to the spout.

DETAILED DESCRIPTION OF THE INVENTION

Figure 1:
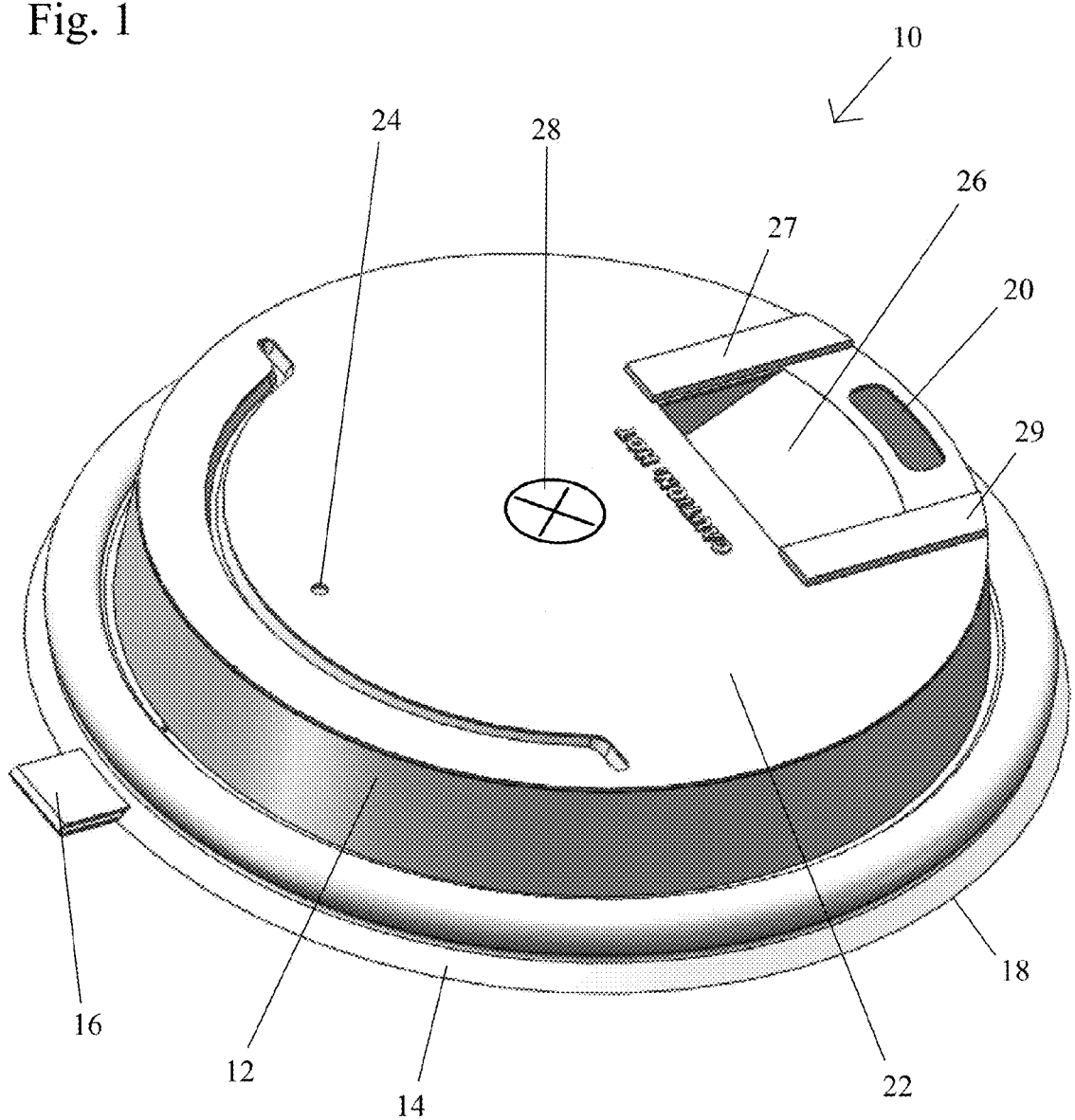
FIG. 1 shows a schematic top perspective view of a beverage container lid with a substantially flat top in an embodiment of the present invention.

A beverage container lid is formed to have a liquid cooling effect in some embodiments and is spill-proof with an elevated portion. The beverage container lid is versatile in that it may be used on all types of cold, hot, and foamy beverages.

The beverage container lid includes an exterior cover and an interior cover connected by a hinge. In some embodiments, the beverage container lid includes an elevated portion, a perforated reservoir bottom, a straw perforation, and a spout. In some embodiments, the elevated portion has steep sides and a planar top surface. In other embodiments, the elevated portion is curved to form a dome shape. In some embodiments, the dome shape is hemispherical in shape. These features make the beverage container lid universal in that it may be used on all kinds of beverage cups or containers, including, but not limited to hot, cold, foamy, or creamy beverage containers. A foamy or cream beverage, as used herein, may be any beverage with a foam or cream topping added to the top surface of the liquid beverage, such as a mixed coffee drink with whipped cream on top of the coffee. The dome allows the merchant to add the topping to a level above the lip of the beverage container without the topping touching the lid. The dome also provides more room under the lid for the user to mix the drink properly using a straw.

When the beverage container lid is used with a hot beverage container, the beverage container lid is a spill-free and burn-free lid with a perforated reservoir, a straw perforation, and a spout and is preferably used in the following manner. The interior cover including the reservoir bottom is simply placed on top of the container, and the hinge is folded to place the exterior cover over the interior cover. The lip of the exterior cover is inserted into an inner lip of the interior cover to hold the exterior cover in place. The cap on the spout is broken off, and the user may then enjoy the hot beverage by drinking through the spout.

When the beverage container lid is used with a foamy or creamy mix beverage container, the beverage container lid includes an elevated portion with a straw perforation and a spout and is preferably used in the following manner. The well portion is pulled off along the reservoir perforation and the reservoir perforation is further broken to detach the reservoir bottom of the interior cover. Just the elevated portion may be used alone by simply placing the interior cover around the lip of the container and then folding the hinge to place the exterior cover over the interior cover. A straw is driven through the straw perforation on the exterior cover and the foamy or creamy mix beverage is ready to be enjoyed. The elevated portion allows more whipped cream or other topping to be added to the top of the beverage without touching the lid.

When the beverage container lid is used with a cold beverage container, the beverage container lid is spill-free with a straw hole, a spout, and a perforated reservoir and is preferably used in the following manner. The interior cover including the reservoir is simply placed on the top of the container, and the hinge is folded to place the exterior cover over the interior cover. A straw is driven through the straw hole on the exterior cover and the straw hole on the interior cover and the cold beverage is ready to be enjoyed. Alternatively, the cap on the spout may be broken off, and the user may then enjoy the cold beverage by drinking through the spout. This innovative feature also enables the merchant to eliminate the use of a conventional straw, when serving cold drinks, including, but not limited to, soda and juice, which is more cost-effective for the merchant and better for the environment.

The reservoir volume prevents spills resulting from any accidental and unwarranted shaking, tipping, or dropping of the beverage container.

The interior cover is preferably designed to snap onto the rim of the beverage container and the exterior cover is designed to be received by the interior cover when the hinge is folded. The interior cover and the exterior cover are connected together by the hinge, and as part of the design, the hinge is folded outside the rim of the cup and not inside the rim. For these reasons, it is not desirable to break the hinge and place only the exterior cover on the beverage container when using the beverage container lid with a foamy or creamy mix beverage. If the interior cover and the exterior cover were to be snapped together before being placed on the beverage container, the hinge would get folded between the beverage container lid and the rim of the beverage container, which would create a gap between the beverage container lid and the beverage container to cause leakage. The interior cover seals on the beverage container first, and then the exterior cover is folded over it so that the hinge folds outside the rim of the beverage container and does not get caught between the lid and the rim of the beverage container to cause any leakage.

In some embodiments, the beverage container lid eliminates the need for a drinking straw as a result of a Sippy cup design with a nipple or spout with a perforated cap on the top, which can be twisted and broken off before consumption. The elimination of a straw for beverage containers not only saves money for the merchant, but also avoids unnecessary waste, which preserves a better and less polluted environment. The raised spout with a perforated cap eliminates the spillage of drink out of a beverage cup in transportation and eliminates the use of a straw for beverage consumption.

In some embodiments, the beverage container lid is degradable, and more specifically, biodegradable. In some embodiments, the beverage container lid material includes a thermoplastic polymer composition with degradability in a natural environment and excellence in transparency and impact strength.

In some embodiments, the beverage container lid is made of a transparent biodegradable material so that the contents of the beverage container may be visually determined. In some embodiments, the biodegradable material is polyhydroxybutyrate (PHB), poly(hydroxybutyrate-co-hydroxyvalerate) (PHBV) copolymer, polylactic acid, or another lactic acid-based polymer. A lactic acid-based polymer, as used herein, refers to polylactic acid or any copolymer of polylactic acid and another hydroxycarboxylic acid.

When the biodegradable polymer material is placed in soil or sea water, it starts to decompose within a few weeks in a moist environment and disappears within several years. Further, final degradation products of these polymers are lactic acid, carbon dioxide, and water, which are nontoxic to humans.

In some embodiments, the beverage container lid is prepared from a biodegradable thermoplastic polymer composition of a lactic acid-based polymer having a molecular weight of at least 10,000. In some embodiments, the biodegradable thermoplastic polymer composition has a light transmission of at least 85%. In some embodiments, the biodegradable thermoplastic polymer composition has a light transmission of at least 90%. In some embodiments, the thermoplastic polymer composition is transparent. In other embodiments, the thermoplastic polymer composition is non-transparent.

In some embodiments, the beverage container lid is formed by pre-forming a thermoplastic polymer composition at a pre-form temperature in the range of 180° C. to 300° C. and drawn blow-molding the pre-form into the beverage container lid at a molding temperature in the range of 20° C. to 125° C. In some embodiments, the pre-form is a parison and the drawn blow-molding is extrusion drawn blow-molding by injection molding or compression or thermo-forming molding. The molding temperature preferably corresponds to the glass transition temperature ($T_g$) of the thermoplastic polymer composition, such as the range of $T_g$ to $T_g+60°$ C. The draw ratio is preferably in the range of 1.2 to 6 times, when the glass transition temperature is in the range of 20° C. to 65° C.

The thermoplastic polymer composition may be formed from monomer units of L-lactic acid, D-lactic acid, glycolic acid, or any combination of these.

A degradable beverage container lid preferably is degraded in a natural environment and has transparency and sufficient impact strength for practical use, shipping, in case of sudden drop of the beverage container.

FIG. 1 shows a schematic perspective view of a beverage container lid 10 with a substantially flat top in a closed position. The exterior cover 12 has been folded over the interior cover 14 by folding the hinge 16 connecting the exterior cover 12 and the interior cover 14. The interior cover 14 includes an outer lip 18 that seals the interior cover 14 around the rim of a beverage container. A spout 20 in the exterior cover 12 allows the user to drink a beverage in the beverage container. An opening, not visible in FIG. 1, allows the beverage to enter a reservoir space formed between the exterior cover and the interior cover. A pair of retaining walls, not visible in FIG. 1, formed in the interior cover 14 extend into indentations 27, 29 in the exterior cover 12 to prevent liquid from flowing over the retaining walls. Instead, beverage from the beverage container must flow through the opening in the interior cover, around the retaining walls, and into the spout 20. These indentations 27, 29 appear as protrusions, when viewed from the top of the exterior cover, as shown in FIG. 1. The top surface of the elevated portion 22 of the exterior cover 12 is substantially planar. A small hole 24 on the top of the lid vents the interior space so that no vacuum is formed and the drink is able to flow out of the spout and into the user's mouth easily. A sloped area or ditch 26 behind the spout 20 receives the user's upper lip, provides comfortable sipping, and captures and traps any possible over flow of beverage after each sip. A straw perforation 28 permits the user to insert a straw through the exterior cover 12 of the beverage container lid 10.

Although the details of the interior cover 14 are not visible in FIG. 1, the interior cover 14 may have any of the features or any combination of the features of the interior covers 34 shown in FIG. 2 through FIG. 13 within the spirit of the present invention.

Figure 2:
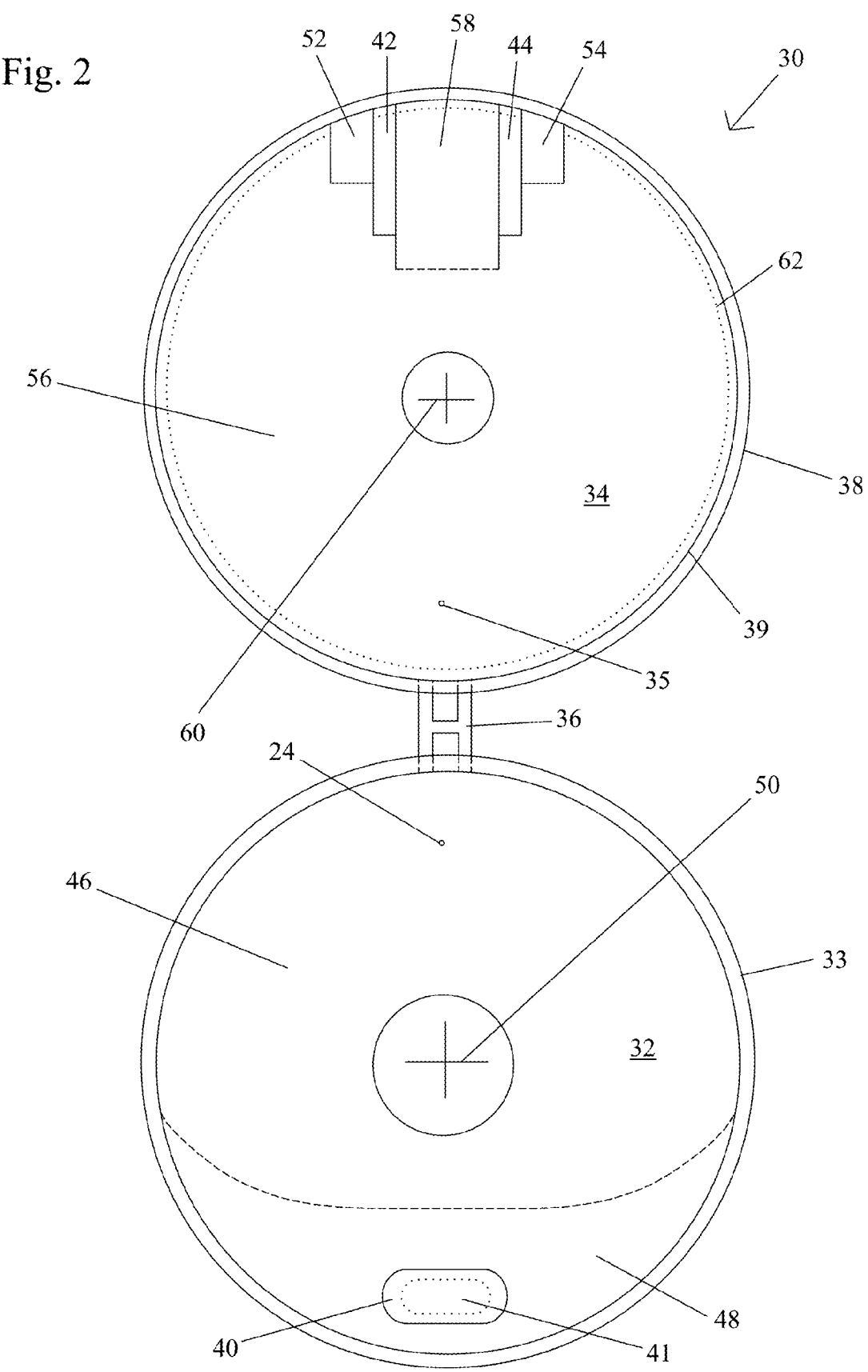
FIG. 2 shows a schematic top open view of a beverage container lid with a dome top in an embodiment of the present invention.

FIG. 2 shows the top surfaces of the interior cover 34 and the bottom surfaces of the exterior cover 32 of a beverage container lid 30 with an elevated portion 46 in an embodiment of the present invention. A hinge 36 flexibly connects the exterior cover 32 to the interior cover 34. An outer lip 38 around the edge of the interior cover 34 attaches the interior cover 34 to the rim of a beverage container. An inner lip 39 on the interior cover 34 receives the lip 33 of the exterior cover 32 to form a seal between the exterior cover 32 and the interior cover 34, thereby forming a reservoir space between the covers 32, 34. A spout 40 in the exterior cover 32 allows the user to drink a beverage in the beverage container. A small hole 24 on the exterior cover 32 vents the interior space so that no vacuum is formed and the drink is able to flow out of the spout and into the user's mouth easily.

A spout cap 41 on the spout 40 blocks the spout 40 until the user is ready to begin drinking through the spout 40 and removes the spout cap 41 along a perforation. A pair of openings 52, 54 allows the beverage to enter a reservoir space formed between the exterior cover 32 and the interior cover 34. A small hole 35 on the interior cover 34 vents the beverage container so that no vacuum in formed and the drink is able to flow through the openings 52, 54. A pair of retaining walls 42, 44 flanks the openings 52, 54, respectively, to prevent the beverage from flowing directly from the openings 52, 54 to the spout 40. The tops of the retaining walls 42, 44 contact a flat portion 48 of the exterior cover 12. The elevated portion 46 of the exterior cover 32 is dome-shaped in FIG. 2 except for a flat portion where a straw perforation 50 is located. The straw perforation 50 permits the user to insert a straw through the exterior cover 32 of the beverage container lid 30.

A reservoir bottom 56 formed in the interior cover 34 forms the bottom edge of the reservoir formed between the interior cover 34 and the exterior cover 32. A well portion 58 between the retaining walls 42, 44 extends below the level of the reservoir bottom 56. A straw perforation 60 located in the reservoir bottom 56 permits the user to insert a straw through the interior cover 34 of the beverage container lid 30. A reservoir perforation 62 allows the reservoir bottom 56, the retaining walls 42, 44, and the well portion 58 to be removed from the remainder of the interior cover 34.

Figure 3:
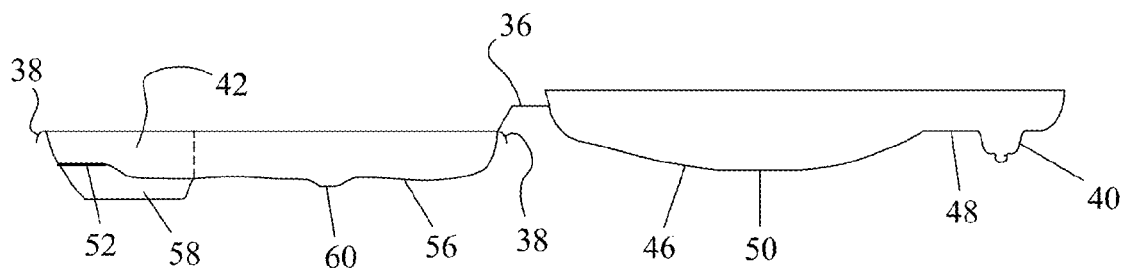
FIG. 3 shows a schematic side open view of the beverage container lid of FIG. 2.

FIG. 3 shows a side profile view of the beverage container lid 30 of FIG. 2. The shapes of the elevated portion 46, the well portion 58, the flat portion 48 around the spout 40, and the areas around the straw perforations 50, 60 are more clearly visible in the view of FIG. 3. FIG. 3, as well as FIG. 4 and FIG. 5, also shows that the openings 52, 54 are located above the surface of the reservoir bottom 56 such that after the beverage container is place back down after the first sip, some of the beverage inside the reservoir drains back into the beverage container, but of the beverage remains spread out on the reservoir bottom 56 in addition to some that is trapped in the well portion 58. In the case of a hot beverage, this remaining liquid cools and mixes with the hot beverage re-entering the reservoir through the openings 52, 54 for the next sip coming out of the cup, which is how the temperature of the hot beverage is reduced to prevent burning of the user's mouth. In some embodiments, the openings 52, 54 are located about 3 millimeters above the surface of the reservoir bottom 56.

Figure 4:
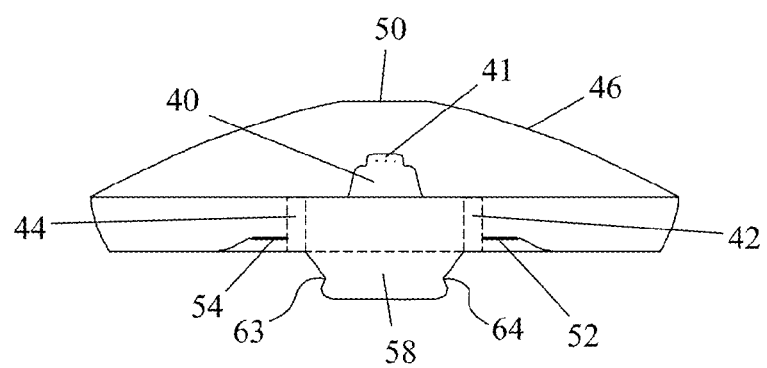
FIG. 4 shows a schematic front closed view of the beverage container lid of FIG. 2.

FIG. 4 shows a front view of the beverage container lid 30 in a closed position. The elevated portion 50 extends upward behind the spout 40. A pair of indentations 63, 64 allows a user to easily grasp the well portion 58 with fingers or fingernails and pull on the well portion 58 to break the perforation 62 between the well portion 58 and the outer edge of the interior cover 34.

Figure 5:
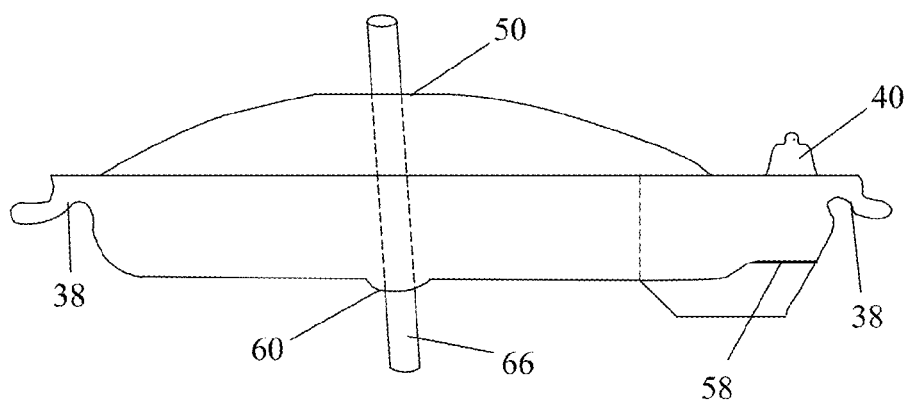
FIG. 5 shows a schematic side closed view of the beverage container lid of FIG. 2.

FIG. 5 shows a side view of the beverage container lid 30 in a closed position with a straw 66 inserted through the straw perforations 50, 60. The straw perforation 60 of the interior cover 34 is preferably small to minimize passage of beverage through the straw perforation 60 around the straw 66 and into the reservoir space in the case of an accidental and unwarranted shaking, tipping, or dropping of the beverage container. The straw perforation 60 of the interior cover 34 is also located in a depression in the reservoir bottom 56, as visible in FIG. 5, in order to aid the user in locating the straw perforation 60 during insertion of a straw 66. The straw perforation 50 in the exterior cover 32 is preferably larger than the straw perforation 60 of the interior cover 34, as visible in FIG. 2, so that the user is able to angle the straw 66 to a greater degree without bending the straw 66 in order to be able to get the bottom of the straw 66 to a bottom edge of the beverage container. A preferred shape of the outer lip 38 is also shown in FIG. 5.

Figure 6:
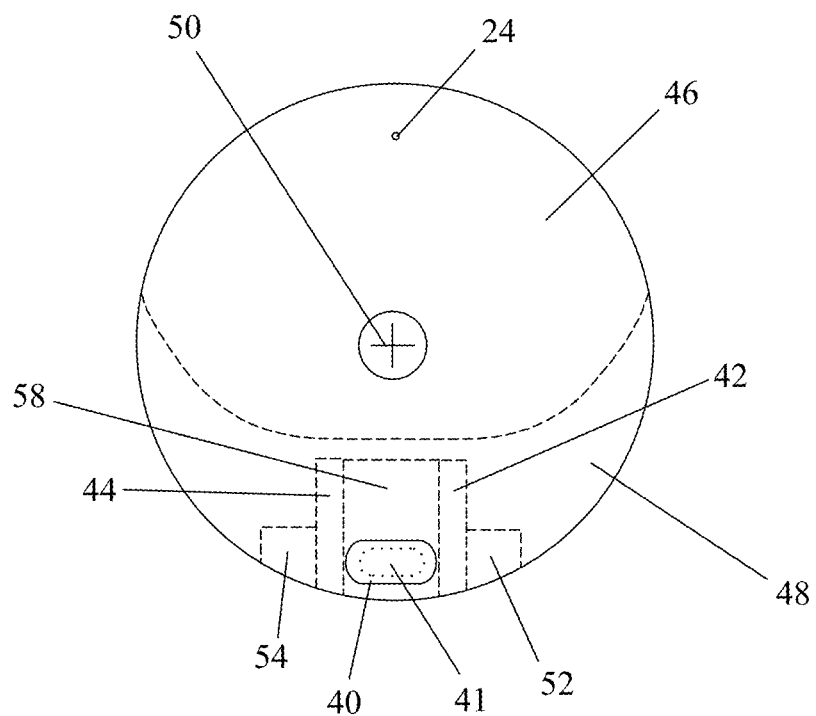
FIG. 6 shows a schematic top closed view of the beverage container lid of FIG. 2.

FIG. 6 shows a top view of the beverage container lid 30 in a closed position to show the relative positions of the openings 52, 54, the retaining walls 42, 44, and the well portion 58 with respect to the spout 40.

Figure 7:
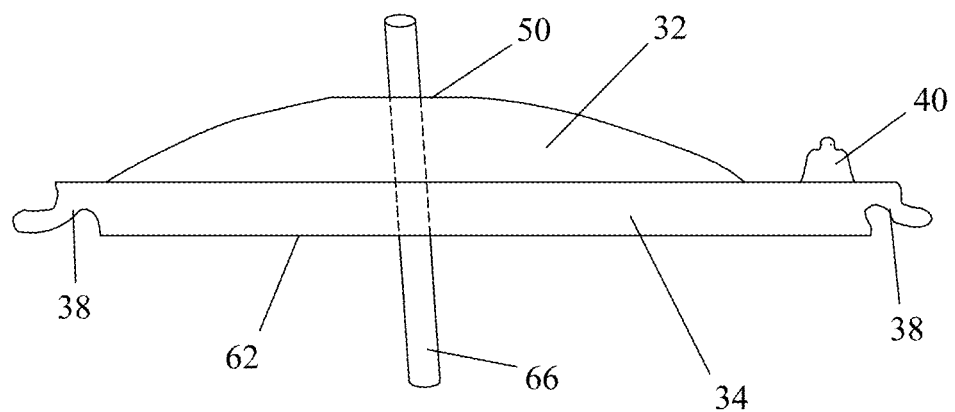
FIG. 7 shows a schematic side closed view of the beverage container lid of FIG. 5 with the reservoir bottom removed.

FIG. 7 shows a side closed view of the beverage container lid similar to FIG. 5, except that with the reservoir bottom has been separated along the reservoir perforation and removed from the beverage container lid.

Although the exterior cover 32 is shown as being flat in the area around the spout 40 in FIGS. 2 through 7, the exterior cover 32 may have indentations similar to the indentations 27, 29 shown in FIG. 1 within the spirit of the present invention. The tops of the retaining walls 42, 44 formed in the interior cover 34 extend into the indentations in the exterior cover 32 to prevent liquid from flowing over the retaining walls 42, 44. Instead, beverage from the beverage container must flow through the openings 52, 54 in the interior cover, around the retaining walls 42, 44, and into the spout 20. These indentations appear as protrusions, when viewed from the top of the exterior cover 72.

With reference to FIG. 2 through FIG. 7, in one method of use of a beverage container lid, the interior cover 34 is placed over the beverage container containing a beverage by placing the outer lip 38 around the rim of the beverage container. The hinge 36 is folded, the exterior cover 32 is placed over the interior cover 34, and the lip 33 of the exterior cover 32 is inserted under the inner lip 39 of the interior cover 34. Finally, the spout cap 41 is broken off the spout 40 and a user may then enjoy the beverage by putting the spout 40 to their mouth and tipping the beverage container toward the spout 40. In this method, the beverage is preferably a hot beverage. The hot beverage enters the reservoir volume through the openings 52, 54. The retaining walls 42, 44 prevent the beverage from flowing directly to the spout 40. Instead the beverage must first flow around the walls 42, 44 toward the reservoir bottom 56. When the user takes a break from drinking and puts the beverage container down upright on a flat surface, some of the beverage in the reservoir volume flows back down into the beverage container through the openings 52, 54, but some flows into the well portion 58, which is directly below the spout 40, where it is retained and is able to cool until the user is ready to take another sip.

In another method of use of the beverage container lid, the reservoir perforation 62 along the well portion 58 and retaining walls 42, 44 is separated. This is preferably accomplished by grasping the indentations 63, 64 flanking the well portion 58 with two fingers on one hand, grasping the outer lip 38 with the other hand and pulling to separate along the reservoir perforation 62. Further pulling then separates the entire reservoir perforation 62 and the portion including the reservoir bottom 56, the well portion 58, and the retaining walls 42, 44, which is discarded. The interior cover 34 is then placed over the beverage container containing a beverage by placing the outer lip 38 around the rim of the beverage container. The hinge 36 is folded, the exterior cover 32 is placed over the interior cover 34, and the lip 33 of the exterior cover 32 is inserted under the inner lip 39 of the interior cover 34. Finally, a straw 66 is inserted through the straw perforation 50 and into the beverage container and a user may then enjoy the beverage by drawing it through the straw 66. In this method, the beverage is preferably a foamy or creamy mix beverage. In some embodiments, however, the beverage may be a cold beverage.

In another method of use of the beverage container lid, the interior cover 34 is placed over the beverage container containing a beverage by placing the outer lip 38 around the rim of the beverage container. The hinge 36 is folded, the exterior cover 32 is placed over the interior cover 34, and the lip 33 of the exterior cover 32 is inserted under the inner lip 39 of the interior cover 34. Finally, a straw 66 is inserted through both of the straw perforations 50, 60 and into the beverage container and a user may then enjoy the beverage by drawing it through the straw 66. In this method, the beverage is preferably a cold beverage.

Figure 8:
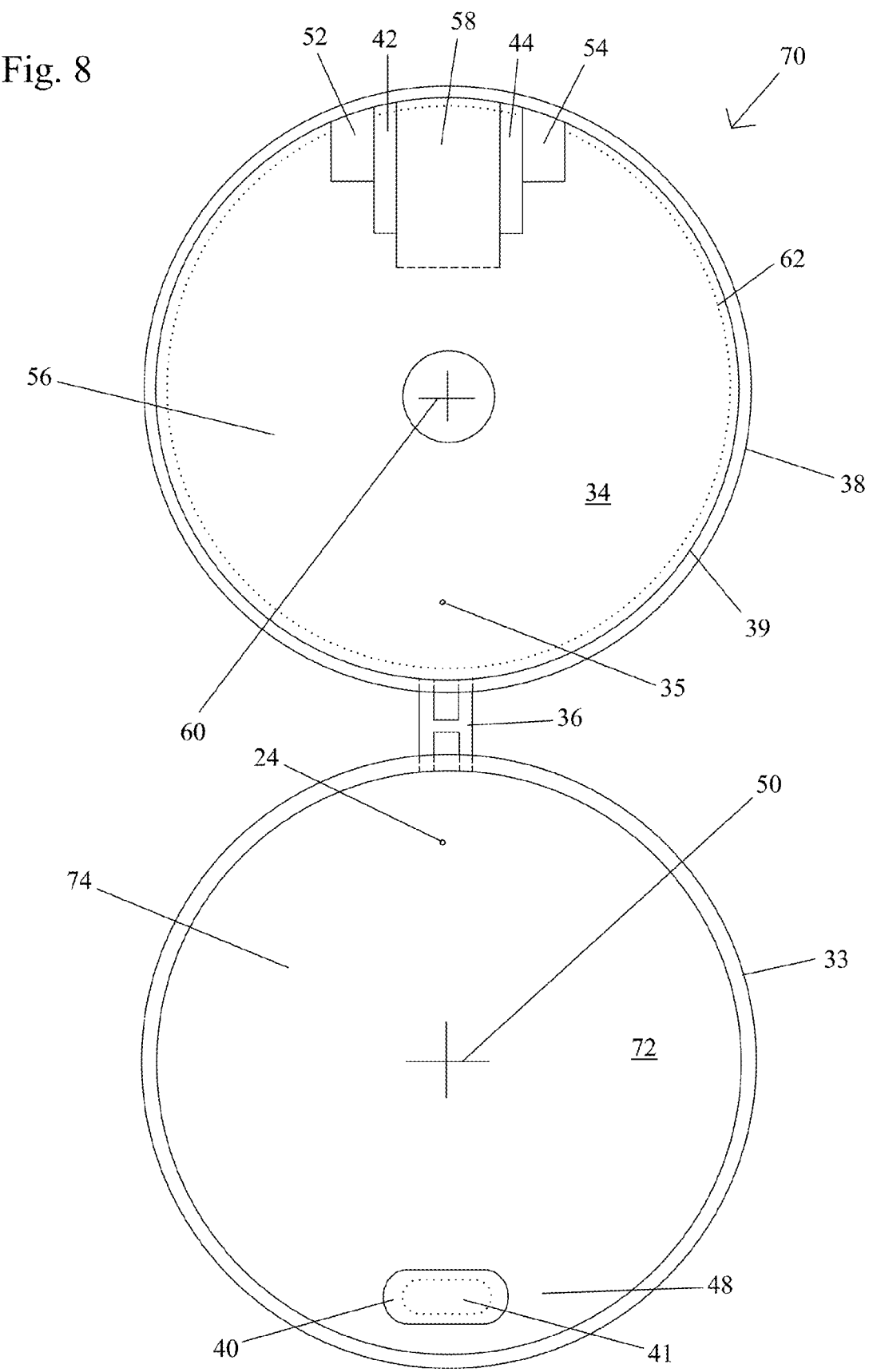
FIG. 8 shows a schematic top open view of a beverage container lid with a flat top in an embodiment of the present invention.

FIG. 8 shows the top surfaces of the interior cover 34 and the bottom surfaces of the exterior cover 72 of a beverage container lid 70 with a flat top elevated portion 74 in an embodiment of the present invention. A hinge 36 flexibly connects the exterior cover 72 to the interior cover 34. An outer lip 38 around the edge of the interior cover 34 attaches the interior cover 34 to the rim of a beverage container. An inner lip 39 on the interior cover 34 receives the lip 33 of the exterior cover 72 to form a seal between the exterior cover 72 and the interior cover 34, thereby forming a reservoir space between the covers 72, 34. A spout 40 in the exterior cover 72 allows the user to drink a beverage in the beverage container. A small hole 24 on the exterior cover 72 vents the interior space so that no vacuum is formed and the drink is able to flow out of the spout and into the user's mouth easily.

A spout cap 41 on the spout 40 blocks the spout 40 until the user is ready to begin drinking through the spout 40 and removes the spout cap 41 along a perforation. A pair of openings 52, 54 allows the beverage to enter a reservoir space formed between the exterior cover 72 and the interior cover 34. A small hole 35 on the interior cover 34 vents the beverage container so that no vacuum in formed and the drink is able to flow through the openings 52, 54. A pair of retaining walls 42, 44 flanks the openings 52, 54, respectively, to prevent the beverage from flowing directly from the openings 52, 54 to the spout 40. The tops of the retaining walls 42, 44 contact a flat portion 48 of the exterior cover 12 around the spout 40. The flat top portion 74 of the exterior cover 72 includes a straw perforation 50, which permits the user to insert a straw through the exterior cover 72 of the beverage container lid 70.

A reservoir bottom 56 formed in the interior cover 34 forms the bottom edge of the reservoir formed between the interior cover 34 and the exterior cover 72. A well portion 58 between the retaining walls 42, 44 extends below the level of the reservoir bottom 56. A straw perforation 60 located in the reservoir bottom 56 permits the user to insert a straw through the interior cover 34 of the beverage container lid 70. A reservoir perforation 62 allows the reservoir bottom 56, the retaining walls 42, 44, and the well portion 58 to be removed from the remainder of the interior cover 34.

Figure 9:
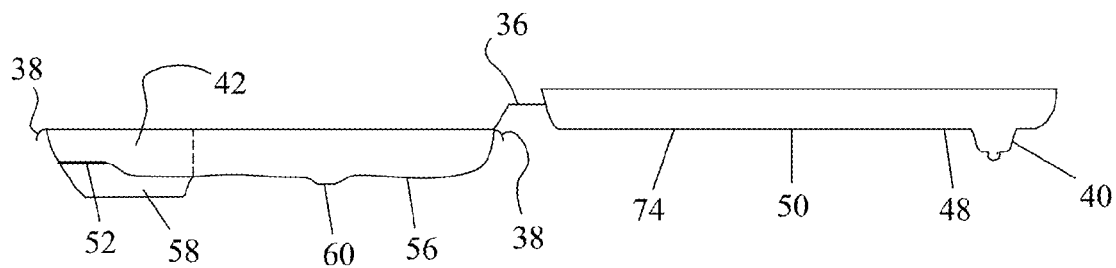
FIG. 9 shows a schematic side open view of the beverage container lid of FIG. 8.
Figure 10:
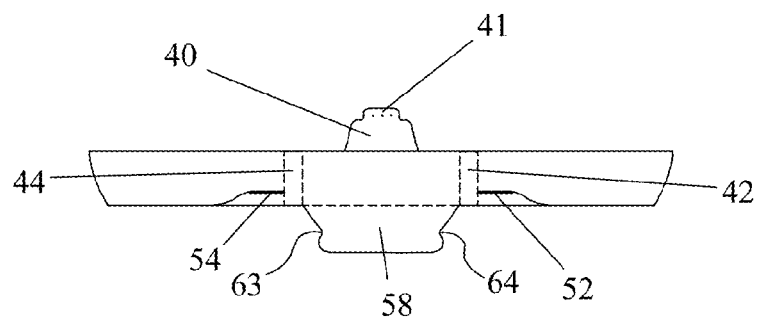
FIG. 10 shows a schematic front closed view of the beverage container lid of FIG. 8.
Figure 11:
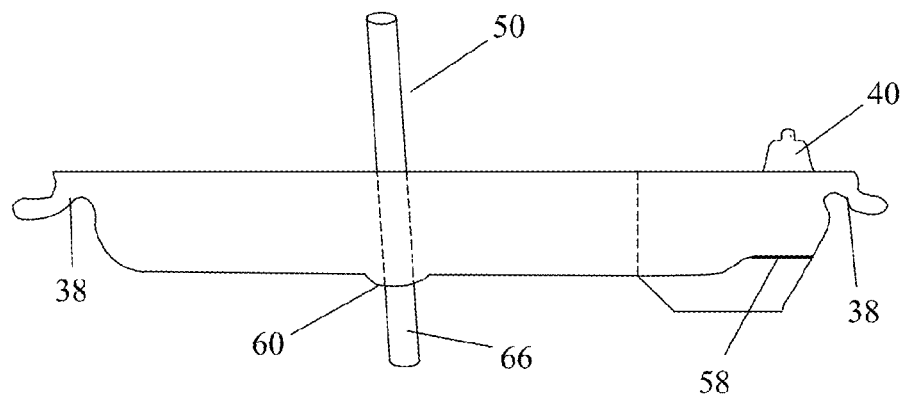
FIG. 11 shows a schematic side closed view of the beverage container lid of FIG. 8.

FIG. 9 shows a side profile view of the beverage container lid 70 of FIG. 8. FIG. 9, as well as FIG. 10 and FIG. 11, shows that the openings 52, 54 are located above the surface of the reservoir bottom 56 such that after the beverage container is place back down after the first sip, some of the beverage inside the reservoir drains back into the beverage container, but of the beverage remains spread out on the reservoir bottom 56 in addition to some that is trapped in the well portion 58. In the case of a hot beverage, this remaining liquid cools and mixes with the hot beverage re-entering the reservoir through the openings 52, 54 for the next sip coming out of the cup, which is how the temperature of the hot beverage is reduced to prevent burning of the user's mouth. In some embodiments, the openings 52, 54 are located about 3 millimeters above the surface of the reservoir bottom 56.

FIG. 10 shows a front view of the beverage container lid 70 in a closed position. The elevated portion 50 extends upward behind the spout 40. A pair of indentations 63, 64 allows a user to easily grasp the well portion 58 with fingers or fingernails and pull on the well portion 58 to break the perforation 62 between the well portion 58 and the outer edge of the interior cover 34.

FIG. 11 shows a side view of the beverage container lid 70 in a closed position with a straw 66 inserted through the straw perforations 50, 60. The straw perforation 60 of the interior cover 34 is preferably small to minimize passage of beverage through the straw perforation 60 around the straw 66 and into the reservoir space in the case of an accidental and unwarranted shaking, tipping, or dropping of the beverage container. The straw perforation 60 of the interior cover 34 is also located in a depression in the reservoir bottom 56, as visible in FIG. 11, in order to aid the user in locating the straw perforation 60 during insertion of a straw 66. The straw perforation 50 in the exterior cover 72 is preferably larger than the straw perforation 60 of the interior cover 34, as visible in FIG. 8, so that the user is able to angle the straw 66 to a greater degree without bending the straw 66 in order to be able to get the bottom of the straw 66 to a bottom edge of the beverage container. A preferred shape of the outer lip 38 is also shown in FIG. 11.

Figure 12:
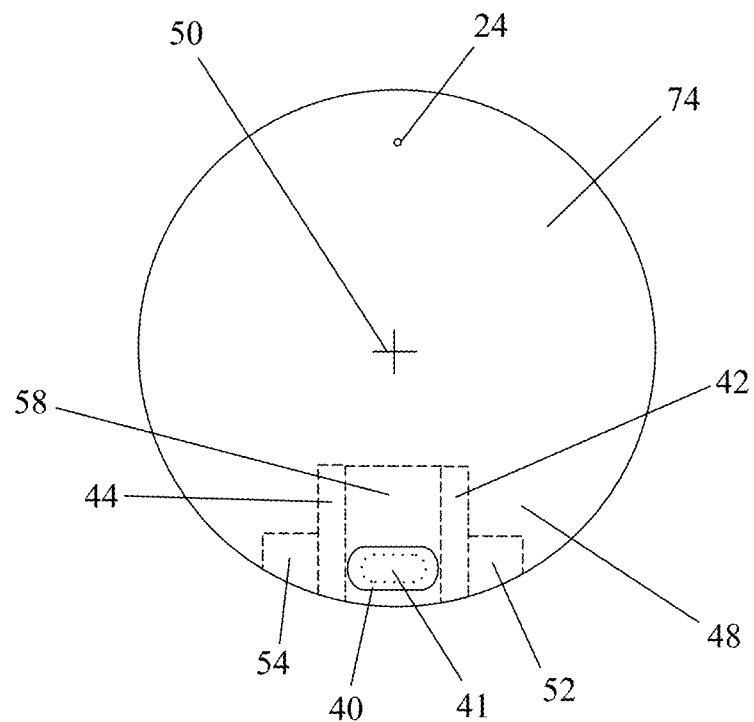
FIG. 12 shows a schematic top closed view of the beverage container lid of FIG. 8.

FIG. 12 shows a top view of the beverage container lid 70 in a closed position to show the relative positions of the openings 52, 54, the retaining walls 42, 44, and the well portion 58 with respect to the spout 40.

Although the exterior cover 72 is shown as being flat in the area around the spout 40 in FIGS. 8 through 12, the exterior cover 72 may have indentations similar to the indentations 27, 29 shown in FIG. 1 within the spirit of the present invention. The tops of the retaining walls 42, 44 formed in the interior cover 34 extend into the indentations in the exterior cover 72 to prevent liquid from flowing over the retaining walls 42, 44. Instead, beverage from the beverage container must flow through the openings 52, 54 in the interior cover 34, around the retaining walls 42, 44, and into the spout 20. These indentations appear as protrusions, when viewed from the top of the exterior cover.

Figure 13:
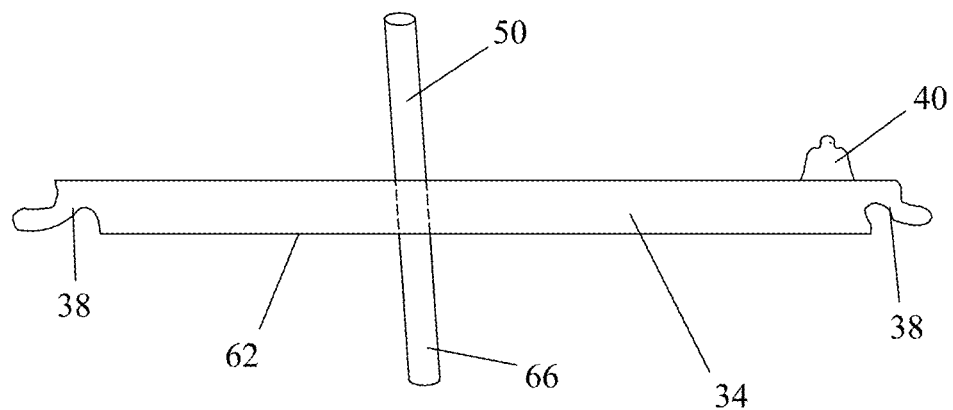
FIG. 13 shows a schematic side closed view of the beverage container lid of FIG. 11 with the reservoir bottom removed.

FIG. 13 shows a side closed view of the beverage container lid similar to FIG. 11, except that with the reservoir bottom has been separated along the reservoir perforation and removed from the beverage container lid.

The reservoir prevents spills resulting from any accidental and unwarranted shaking, tipping, or dropping of the beverage container.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A beverage container lid for attachment to a beverage container containing a beverage, the beverage container lid comprising:
   an interior cover having a pair of openings to allow passage of the beverage in the beverage container through the interior cover, the interior cover comprising:
   a reservoir bottom;
   a well portion extending downward from an edge of the reservoir bottom to form a well;
   a pair of retaining walls, each retaining wall extending upward from the edge of the reservoir bottom and flanking a side of the well portion and a side of one of the pair of openings, each retaining wall extending inward past one of the pair of openings;
   an outer lip extending around an outer edge of the reservoir bottom, the well portion, and the retaining walls, the outer lip being formed to receive a rim of the beverage container and being separable from the reservoir bottom, the well portion, and the pair of retaining walls by way of a ring of perforations along the outer edge of the reservoir bottom, the well portion, and the retaining walls; and
   an inner lip extending inward from an upper side of the outer lip;
   an exterior cover having an outer edge sized to be received by the inner lip of the interior cover, the exterior cover comprising:
   a flat portion extending inward from the outer edge of the exterior cover; and
   a spout extending upward from the flat portion; and
   a hinge connecting the interior cover to the exterior cover and foldable to orient the exterior cover over the interior cover;
   wherein:
   the interior cover, the exterior cover, and the hinge are arranged such that, when the hinge is folded and the outer edge of the exterior cover is received by the inner lip of the interior cover;
   the spout is located above the well portion; and
   each retaining wall contacts the flat portion of the exterior cover, thereby preventing the beverage in the beverage container from flowing directly from the pair of openings of the interior cover to the spout of the exterior cover.

2. The beverage container lid of claim 1, wherein the spout further comprises a cap separable from the exterior cover by a cap perforation to provide a spout hole in the spout.

3. The beverage container lid of claim 1, wherein the exterior cover has an exterior straw perforation sized to receive a drinking straw.

4. The beverage container lid of claim 1, wherein the reservoir bottom has a reservoir straw perforation sized to receive a drinking straw.

5. The beverage container lid of claim 1, wherein the exterior cover further comprises an elevated portion extending upward from an edge of the flat portion.

6. The beverage container lid of claim 5, wherein the elevated portion has a curved shape.

7. The beverage container lid of claim 5, wherein the elevated portion has a hemispherical shape.

8. The beverage container lid of claim 5, wherein the elevated portion has a planar top surface and steep sides.

9. The beverage container lid of claim 5, wherein the elevated portion has an exterior straw perforation sized to receive a drinking straw.

10. The beverage container lid of claim 1, wherein the well portion has a pair of indentations on opposing sides of the well portion to aid in gripping the well portion for removal of the reservoir bottom, the well portion, and the pair of retaining walls from the beverage container lid by way of the ring of perforations.

11. The beverage container lid of claim 1, wherein the pair of openings of the interior cover are located such that when the interior cover is horizontal, the pair of openings of the interior cover are at a higher elevation than the reservoir bottom of the interior cover.

12. The beverage container lid of claim 1 further comprising a pair of indentations in the flat portion of the exterior cover, wherein the pair of retaining walls of the interior cover is received by the pair of indentations of the flat portion of the exterior cover, thereby preventing the beverage in the beverage container from flowing directly from the pair of openings of the interior cover to the spout of the exterior cover.

\* \* \* \* \*